United States Patent
Sunil Kumar et al.

(10) Patent No.: US 10,901,424 B2
(45) Date of Patent: Jan. 26, 2021

(54) METHOD AND SYSTEM FOR GENERATING A SAFE NAVIGATION PATH IN REAL-TIME FOR NAVIGATING A VEHICLE

(71) Applicant: WIPRO LIMITED, Bangalore (IN)

(72) Inventors: Balaji Sunil Kumar, Bengaluru (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 300 days.

(21) Appl. No.: 15/940,429

(22) Filed: Mar. 29, 2018

(65) Prior Publication Data
US 2019/0302780 A1  Oct. 3, 2019

(30) Foreign Application Priority Data
Mar. 28, 2018 (IN) .............................. 201841011760

(51) Int. Cl.
| | |
|---|---|
| G05D 1/02 | (2020.01) |
| G06K 9/00 | (2006.01) |
| G08G 1/0962 | (2006.01) |
| G08G 1/0967 | (2006.01) |
| G08G 1/0968 | (2006.01) |
| B60W 30/00 | (2006.01) |
| G01C 21/28 | (2006.01) |
| G01S 17/931 | (2020.01) |

(52) U.S. Cl.
CPC .......... *G05D 1/0214* (2013.01); *B60W 30/00* (2013.01); *G01C 21/28* (2013.01); *G01S 17/931* (2020.01); *G05D 1/024* (2013.01); *G06K 9/00805* (2013.01); *G08G 1/09626* (2013.01); *G08G 1/096725* (2013.01); *G08G 1/096816* (2013.01); *G05D 2201/0213* (2013.01)

(58) Field of Classification Search
CPC .... G05D 1/0214; G05D 1/024; G01S 17/931; B60W 30/00; G01C 21/28; G06K 9/00805; G08G 1/09626
USPC .......................................................... 701/26
See application file for complete search history.

(56) References Cited

U.S. PATENT DOCUMENTS

| | | |
|---|---|---|
| 8,825,260 B1 | 9/2014 | Silver et al. |
| 9,453,941 B2 | 9/2016 | Stainvas Olshansky et al. |
| 2007/0048084 A1* | 3/2007 | Jung .................... G09F 9/35 404/9 |

(Continued)

*Primary Examiner* — Peter D Nolan
*Assistant Examiner* — Wae L Louie
(74) *Attorney, Agent, or Firm* — Finnegan, Henderson, Farabow, Garrett & Dunner, LLP

(57) ABSTRACT

Disclosed subject matter relates to vehicle navigation system that performs a method for generating safe navigation path in real-time for safe navigation of vehicle. A path generating system associated with the vehicle may receive a pre-generated navigation path, between source point and destination point. Further, the path generating system may determine uneven points and boundary points on road using sensors configured in the vehicle, within a predetermined volumetric region. Further, a preferred side of the road may be determined and a centre path line may be shifted by a distance towards the preferred side to obtain a new centre path line. Finally, the path generating system may indicate plurality of navigation points on the new centre path line that are curve fitted to generate the safe navigation path for safe navigation of the vehicle. The safe navigation path minimizes jerks experienced by the vehicle and increases safety of vehicle.

17 Claims, 9 Drawing Sheets

(56) References Cited

U.S. PATENT DOCUMENTS

| | | |
|---|---|---|
| 2014/0336842 A1 | 11/2014 | Jang et al. |
| 2016/0339959 A1* | 11/2016 | Lee .................... G06K 9/00798 |
| 2019/0080612 A1* | 3/2019 | Weissman .............. G08G 1/164 |
| 2019/0163993 A1* | 5/2019 | Koo ...................... B60W 30/12 |
| 2019/0225267 A1* | 7/2019 | Ohtani ............... G06K 9/00798 |

* cited by examiner

METHOD AND SYSTEM FOR GENERATING A SAFE NAVIGATION PATH IN REAL-TIME FOR NAVIGATING A VEHICLE

TECHNICAL FIELD

The present subject matter relates generally to field of vehicle navigation system, and more particularly, but not exclusively to a method and a system for generating a safe navigation path in real-time for safe navigation of a vehicle.

BACKGROUND

Generally, vehicles make use of navigation path for navigating from a source point to a destination point. Nowadays, the navigation path is widely used in autonomous vehicle technology for navigating autonomous vehicles. The autonomous vehicle technology aims to reduce energy consumption, pollution, reduce frequency of crashes and congestion thereby providing increased road safety. The autonomous vehicles are the vehicles that are capable of sensing environment around them for moving on the road without any human intervention. The autonomous vehicles sense the environment with help of sensors configured to work in systems such as Light Detection and Ranging (LIDAR) system, Image capturing devices, Global Positioning System (GPS) and the like.

Existing techniques may disclose obstacle avoidance systems for vehicles that proactively enable various safety driving features of the vehicle or to make changes to current operation of the vehicle to avoid the obstacles detected along the navigation path such as water, ice, rocks, snow and the like. Further, the existing techniques disclose obstacle avoidance systems that control suspension of the vehicle based on the obstacles detected along the navigation path.

However, the existing techniques that provide the obstacle avoidance systems may concentrate only on the aspect of how to avoid the obstacles on the road such as objects present on the road, other vehicles moving on the road, boundaries of the road and the like, but may fail to address issues related to uneven surface of the road. As an example, the uneven surface of the road may occur due to pot holes, speed breakers, gravel, and the like.

The existing techniques do not provide a mechanism for providing a navigation path in real-time based on surface condition of the road, that ensures deviation of the vehicle towards smooth/even surface of the road, for achieving a smooth/comfortable driving experience.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of generating a safe navigation path in real-time for safe navigation of a vehicle. The method includes receiving, by a path generating system associated with the vehicle, a pre-generated navigation path between a source point and a destination point, from one or more sources. Further, the path generating system determines, while the vehicle is navigating in the pre-generated navigation path, one or more uneven points on the road, within a predetermined volumetric region from a current position of the vehicle, using one or more sensors configured in the vehicle. Upon determining the one or more uneven points on the road, the path generating system determines a preferred side from a centre path line of the road in the predetermined volumetric region based on density of the one or more uneven points. Further, the path generating system shifts the centre path line for a distance identified from the centre path line towards the preferred side, to obtain a new centre path line. Finally, the path generating system indicates plurality of navigation points on the new centre path line. The plurality of navigation points is curve fitted to generate the safe navigation path for safe navigation of the vehicle.

Further, the present disclosure includes a path generating system for generating a safe navigation path in real-time for safe navigation of a vehicle. The path generating system includes a processor and a memory communicatively coupled to the processor. The memory stores the processor-executable instructions, which, on execution, causes the processor to receive a pre-generated navigation path between a source point and a destination point, from one or more sources. Further, the processor determines, while the vehicle is navigating in the pre-generated navigation path, one or more uneven points on the road, within a predetermined volumetric region from a current position of the vehicle, using one or more sensors configured in the vehicle. Upon determining the one or more uneven points on the road, the processor determines a preferred side from a centre path line of the road in the predetermined volumetric region based on density of the one or more uneven points. Further, the processor shifts the centre path line for a distance identified from the centre path line towards the preferred side, to obtain a new centre path line. Finally, the processor indicates plurality of navigation points on the new centre path line. The plurality of navigation points is curve fitted to generate the safe navigation path for safe navigation of the vehicle.

Furthermore, the present disclosure comprises a non-transitory computer readable medium including instructions stored thereon that when processed by at least one processor causes a path generating system to perform operations comprising receiving a pre-generated navigation path between a source point and a destination point, from one or more sources. Further, the instructions cause the processor to determine while the vehicle is navigating in the pre-generated navigation path, one or more uneven points on road, within a predetermined volumetric region from a current position of the vehicle, using one or more sensors configured in the vehicle. Furthermore, the instructions cause the processor to determine a preferred side from a centre path line of the road in the predetermined volumetric region based on density of the one or more uneven points. Further, the instructions cause the processor to shift the centre path line for a distance identified from the centre path line towards the preferred side, to obtain a new centre path line. Finally, the instructions cause the processor to indicate plurality of navigation points on the new centre path line, wherein the plurality of navigation points is curve fitted to generate the safe navigation path for safe navigation of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
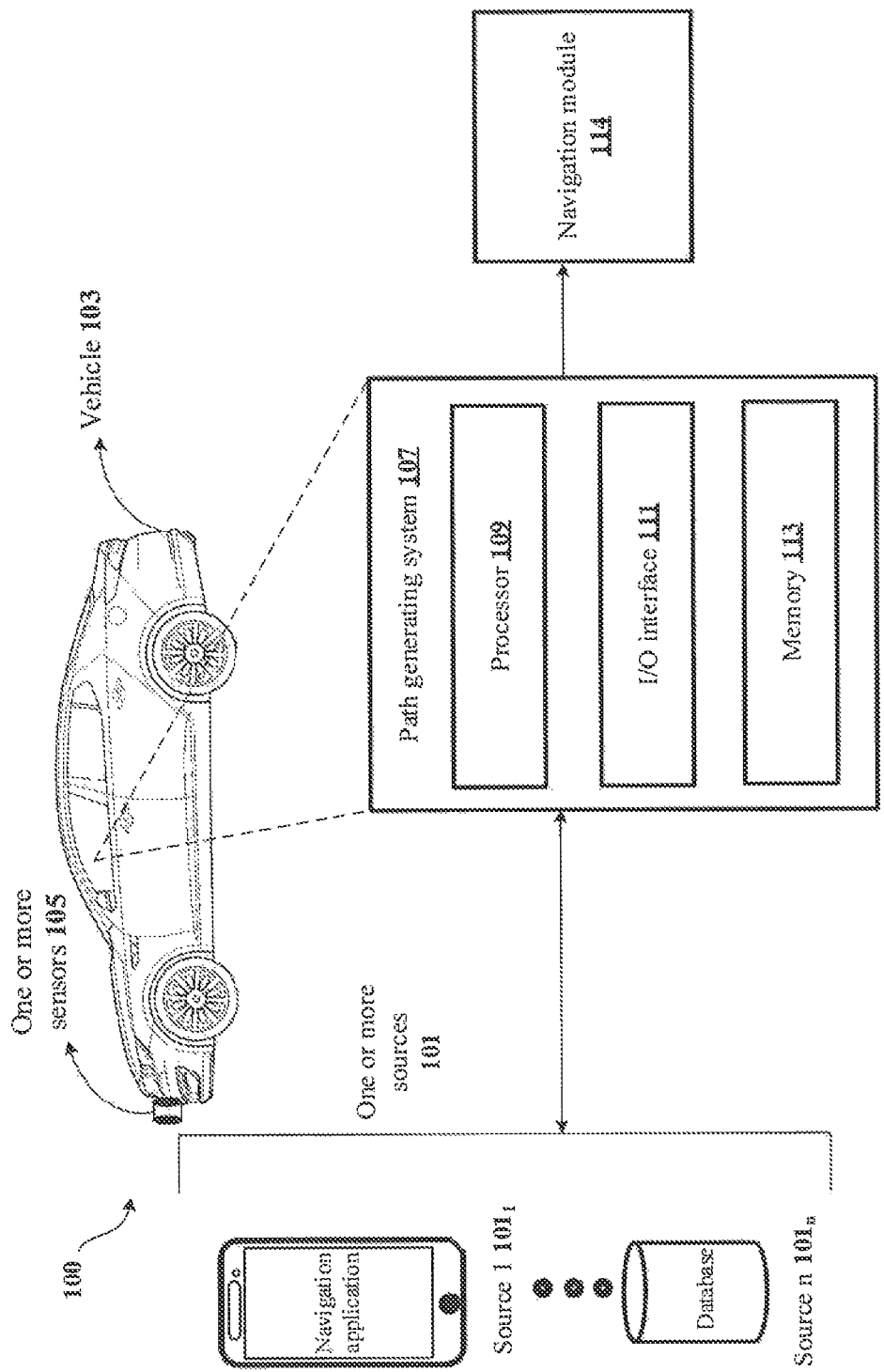
FIG. 1 shows an exemplary architecture for generating a safe navigation path in real-time for safe navigation of a vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating a safe navigation path in real-time for safe navigation of a vehicle. As an example, the vehicle may be at least one of an autonomous vehicle or a non-autonomous vehicle. A path generating system associated with the vehicle, may receive a pre-generated navigation path between a source point and a destination point from one or more sources. As an example, the one or more sources may include, but not limited to, an application related to maps such as a navigation application and a database storing static maps. In some embodiments, the pre-generated navigation path may be confined between boundaries of a road. In some embodiments, when the vehicle is navigating along the pre-generated navigation path, the path generating system may select a predetermined volumetric region from a current position of the vehicle, for understanding surface condition of the road. In some embodiments, the predetermined volumetric region may be a segment of the road selected by the path generating system at a given instance, for generating the safe navigation path.

Further, the path generating system may determine, one or more uneven points on the road, within the predetermined volumetric region, while the vehicle is navigating in the pre-generated navigation path, using one or more sensors configured in the vehicle. As an example, the one or more sensors may include, but not limited to, Light Detection and Ranging (LIDAR) sensors. In some embodiments, the one or more uneven points may occur on the road due to presence of one or more obstacles on the road. As an example, the one or more obstacles may include, but not limited to, speed breakers, pot holes, stones, uneven surface of the road and miscellaneous objects on the road affecting smooth driving experience of the vehicle. In some embodiments, the path generating system may concurrently determine one or more boundary points of the road based on elevation of the one or more uneven points.

Upon determining the one or more uneven points and the one or more boundary points, the path generating system may determine a preferred side from a centre path line of the road in the predetermined volumetric region. In some embodiments, the centre path line may be an imaginary line along centre of the road. In some embodiments, the preferred side of the road may be determined based on density of the one or more uneven points. Further, the path generating system may identify a distance towards the preferred side from the centre path line based on the density of the one or more uneven points, to shift the centre path line towards the preferred side by the determined distance. Upon shifting the centre path line by the determined distance, the path generating system may obtain a new centre path line.

Further, the path generating system may indicate plurality of navigation points on the new centre path line. As an example, when the number of navigation points are two, the path generating system may indicate one navigation point at end of the predetermined volumetric region and one navigation point at middle of the predetermined volumetric region. Further, the path generating system may curve fit the plurality of navigation points to generate the safe navigation path for safe navigation of the vehicle. In some embodiments, the path generating system may curve fit the plurality of navigation points using one or more predefined curve fitting techniques.

In the present disclosure, the safe navigation path may help the vehicle to navigate away from the one or more uneven points and ensures no damage for the vehicle due to the one or more obstacles on the road, thereby resulting in good performance of the vehicle. Also, navigating along the safe navigation path increases safety of passengers in the vehicle.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for generating a safe navigation path in real-time for safe navigation of a vehicle in accordance with some embodiments of the present disclosure.

The architecture 100 includes one or more sources, source $101_1$ to source $101_n$ (collectively referred as one or more sources 101), a vehicle 103, one or more sensors, sensor 105 to sensor 105. (collectively referred as one or more sensors 105), a path generating system 107 and a navigation module 114. As an example, the one or more sources 101 may include, but not limited to, an application related to maps such as a navigation application and a repository storing static maps. In some embodiments, the one or more sources 101 may provide static maps generated using Light Detection and Ranging (LIDAR) sensors. In some embodiments, the one or more sources 101 may be associated with the path generating system 107 via a communication network (not shown in FIG. 1). As an example, the communication network may include a wired communication network or a wireless communication network. In some embodiments, the path generating system 107 may be configured within the vehicle 103 as shown in the FIG. 1. In some other embodiments, the path generating system 107 may be remotely associated with the vehicle 103 via the wireless communication network. In some embodiments, the one or more sensors 105 may be configured in predefined positions of the vehicle 103. As an example, the one or more sensors 105 may include, but not limited to, the LIDAR sensors. Further, the one or more sensors 105 may be detachable from the vehicle 103 and repositioned at any of the predefined positions on the vehicle 103. In some embodiments, the vehicle 103 may be an autonomous vehicle or a non-autonomous vehicle. As an example, the vehicle 103 may be a bike, a car, a truck, a bus and the like.

The path generating system 107 includes a processor 109, an Input/output (I/O) interface 111 and a memory 113. The I/O interface 111 may be configured to receive a pre-generated navigation path between a source point and a destination point, from the one or more sources 101. In some embodiments, the pre-generated navigation path may be confined between boundaries of a road. The processor 109 may also provide a safe navigation path to the navigation module 114 through the I/O interface 111. In some embodiments, the one or more sources 101 may obtain the pre-generated navigation path using one or more predefined standard techniques such as Dijkstra's algorithm, A-star algorithm and the like, upon receiving the source point and the destination point. In some embodiments, the source point and the destination point may be provided as inputs to the path generating system 107 by a user associated with the path generating system 107. Further, the processor 109 may store the pre-generated navigation path in the memory 113 coupled with the processor 109.

In some embodiments, when the vehicle 103 is navigating along the pre-generated navigation path, the processor 109 may select a predetermined volumetric region from a current position of the vehicle 103, for understanding surface condition of the road. In some embodiments, the predetermined volumetric region may be a segment of the road selected by the processor 109 at a given instance, for generating the safe navigation path. In some embodiments, length of the road may be considered as a predetermined maximum length, when the road is straight up to the predetermined maximum length from the current position of the vehicle 103. In some other embodiments, when the road exceeds a predefined angular threshold due to a curve, the length of the predetermined volumetric region may be determined dynamically based on straightness of the road. As an example, assume the predetermined maximum length is 20 metres. However, at 10 metres, curve of the road may exceed the predefined angular threshold. In such scenarios, the processor 109 may dynamically determine the length of the predetermined volumetric region as 10 metres. Further, width of the predetermined volumetric region may be obtained based on pre-existing data of the road stored in the memory 113. Furthermore, height of the predetermined volumetric region may be a predefined height. As an example, the predefined height may be 10 cm above surface of the road and 10 cm below the surface of the road.

Upon selecting the predetermined volumetric region, the processor 109 may generate 3-Dimensional (3D) circular rays at a predefined elevation from a predefined surface height of the road using the one or more sensors 105, in the predetermined volumetric region. Further, the processor 109 may detect a change in elevation from the predefined elevation at one or more points on the 3D circular rays, when the 3D circular rays incident on one or more obstacles on the road. As an example, the one or more obstacles may include, but not limited to, speed breakers, pot holes, stones and miscellaneous objects on the road affecting smooth driving experience of the vehicle 103. Based on the change in the elevation from the predefined elevation and status of the change in the elevation, the processor 109 may determine the one or more points as at least one of, one or more boundary points, or one or more uneven points. In some embodiments, the status of the change in the elevation may include, but not limited to, permanent change in the elevation and temporary change in the elevation.

Upon determining the one or more uneven points and the one or more boundary points, the processor 109 may determine a preferred side from a centre path line of the road in the predetermined volumetric region. In some embodiments, the centre path line may be an imaginary line along centre of the road. In some embodiments, the preferred side of the road may be determined based on density of the one or more uneven points.

Further, the processor 109 may identify a distance towards the preferred side from the centre path line based on the density of the one or more uneven points, to shift the centre path line towards the preferred side by the determined distance within boundaries of the road. Upon shifting the centre path line by the determined distance, the processor 109 may obtain a new centre path line. Further, the processor 109 may indicate plurality of navigation points on the new centre path line. As an example, when the number of navigation points is two, the path generating system may indicate one navigation point at end of the predetermined volumetric region and one navigation point at middle of the predetermined volumetric region. Further, the processor 109 may curve fit the plurality of navigation points to generate the safe navigation path for safe navigation of the vehicle 103. In some embodiments, the processor 109 may curve fit the plurality of navigation points using one or more pre-defined curve fitting techniques.

Upon generating the safe navigation path, the processor 109 may provide the safe navigation path to the navigation module 114 associated with the path generating system 107 for navigating the vehicle 103. In some embodiments, the navigation module 114 may be configured in the vehicle 103. The navigation module 114 may determine a command velocity for the vehicle 103 based on dynamic data received for navigating the vehicle 103 along the safe navigation path.

Figure 2A:
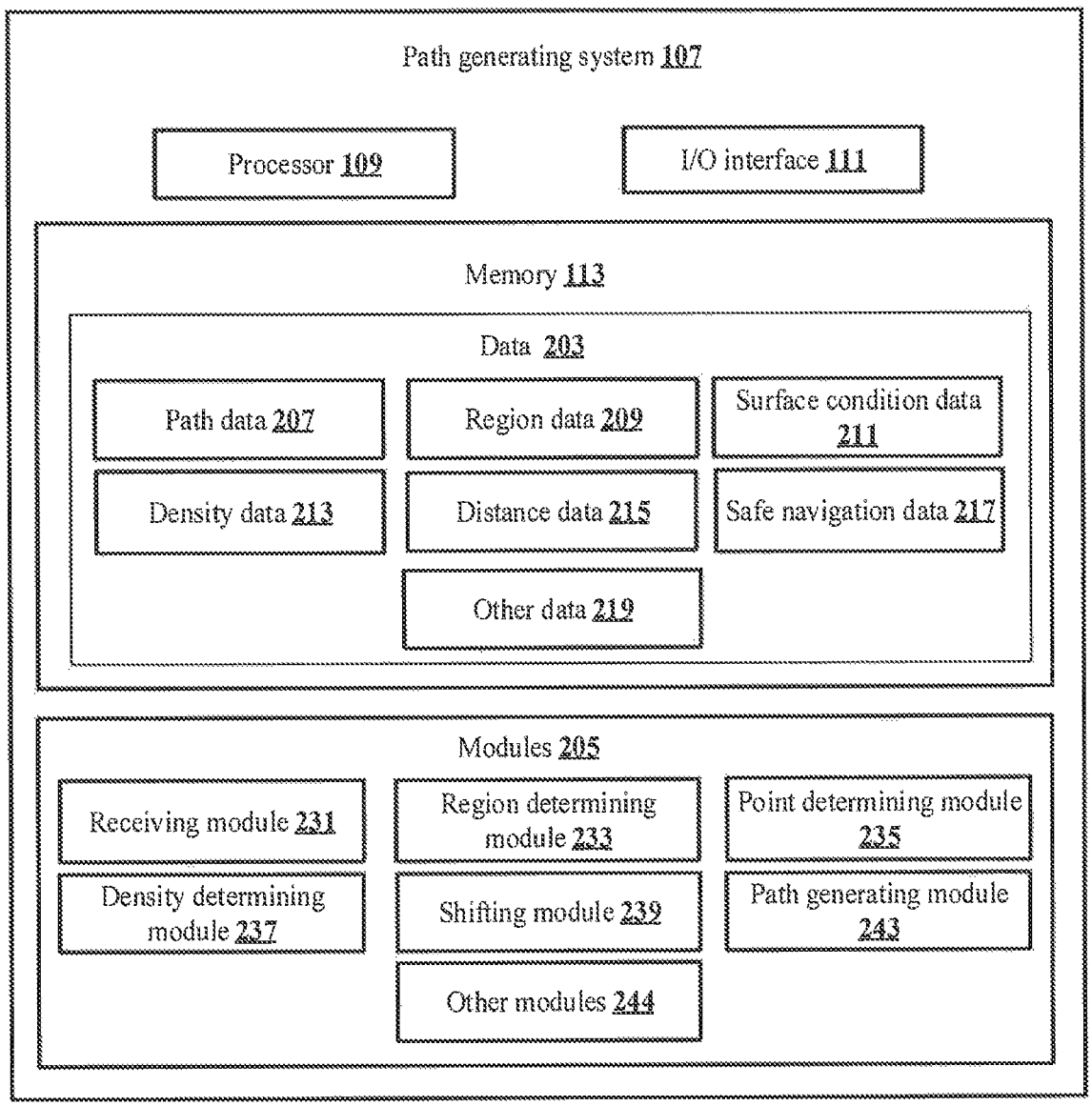
FIG. 2A shows a detailed block diagram of a path generating system for generating a safe navigation path in real-time for safe navigation of a vehicle in accordance with some embodiments of the present disclosure.

FIG. 2A shows a detailed block diagram of a path generating system for generating a safe navigation path in real-time for safe navigation of a vehicle in accordance with some embodiments of the present disclosure.

In some implementations, the path generating system 107 may include data 203 and modules 205. As an example, the data 203 is stored in a memory 113 configured in the path generating system 107 as shown in the FIG. 2A. In one embodiment, the data 203 may include path data 207, region data 209, surface condition data 211, density data 213, distance data 215, safe navigation data 217 and other data 219. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 219 may store data, including temporary data and temporary files, generated by the modules 205 for performing the various functions of the path generating system 107.

In some embodiments, the data 203 stored in the memory 113 may be processed by the modules 205 of the path generating system 107. The modules 205 may be stored within the memory 113. In an example, the modules 205 communicatively coupled to the processor 109 configured in the path generating system 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 231, a region determining module 233, a point determining module 235, a density determining module 237, a shifting module 239, a path generation module 243 and other modules 244. The other modules 239 may be used to perform various miscellaneous functionalities of the path generating system 107. It will be appreciated that such aforementioned modules 205 may be represented as a single module or a combination of different modules.

In some embodiments, the receiving module 231 may receive a pre-generated navigation path between a source point and a destination point, from one or more sources 101 when the vehicle 103 is about to start journey from the source point to the destination point. The pre-generated navigation path along with the source point and the destination point may be stored as the path data 207. As an example, the one or more sources 101 may include, but not limited to, an application related to maps such as a navigation application and a repository storing static maps. In some embodiments, the one or more sources 101 may provide static maps generated using Light Detection and Ranging (LIDAR) sensors.

In some embodiments, the region determining module 233 may select a predetermined volumetric region from a current position of the vehicle 103, for understanding surface condition of the road, when the vehicle 103 is navigating along the pre-generated navigation path. In some embodiments, the predetermined volumetric region may be a segment of the road selected by the region determining module 233 at a given instance, for generating the safe navigation path. The predetermined volumetric region determined by the region determining module 233 for current position of the vehicle 103 may be stored as the region data 209. In some embodiments, length of the road may be considered as a predetermined maximum length, when the road is straight up to the predetermined maximum length from the current position of the vehicle 103. In some other embodiments, when the road exceeds a predefined angular threshold due to a curve, the length of the predetermined volumetric region may be determined dynamically based on straightness of the road. As an example, assume the predetermined maximum length is 20 metres. However, at 10 metres, curve of the road may exceed the predefined angular threshold. In such scenarios, the processor 109 may dynamically determine the length of the predetermined volumetric region as 10 metres. Further, width of the predetermined volumetric region may be obtained based on pre-existing data of the road stored in the memory 113. Furthermore, height of the predetermined volumetric region may be a predefined height. As an example, the predefined height may be 10 cm above surface of the road and 10 cm below the surface of the road. An exemplary predetermined volumetric region 250 is as shown in the FIG. 2B. In some embodiments, a next predetermined volumetric region may be selected, when the vehicle 103 navigating along the road crosses the current predetermined volumetric region.

In some embodiments, the point determining module 235 may determine one or more uneven points on the road, within the predetermined volumetric region using one or more sensors configured in the vehicle 103, while the vehicle 103 is navigating along the pre-generated navigation path. The one or more uneven points and the one or more boundary points may be stored as the surface condition data 211. In some embodiments, the one or more sensors 105 may include, but not limited to, the LIDAR sensors. In some embodiments, the point determining module 235 may determine one or more boundary points of the road, simultaneously when the one or more uneven points on the road are being determined.

Initially, the point determining module 235 may generate 3-Dimensional (3D) circular rays at a predefined elevation from a predefined surface height of the road using the one or more sensors 105, in the predetermined volumetric region.

Figure 2B:
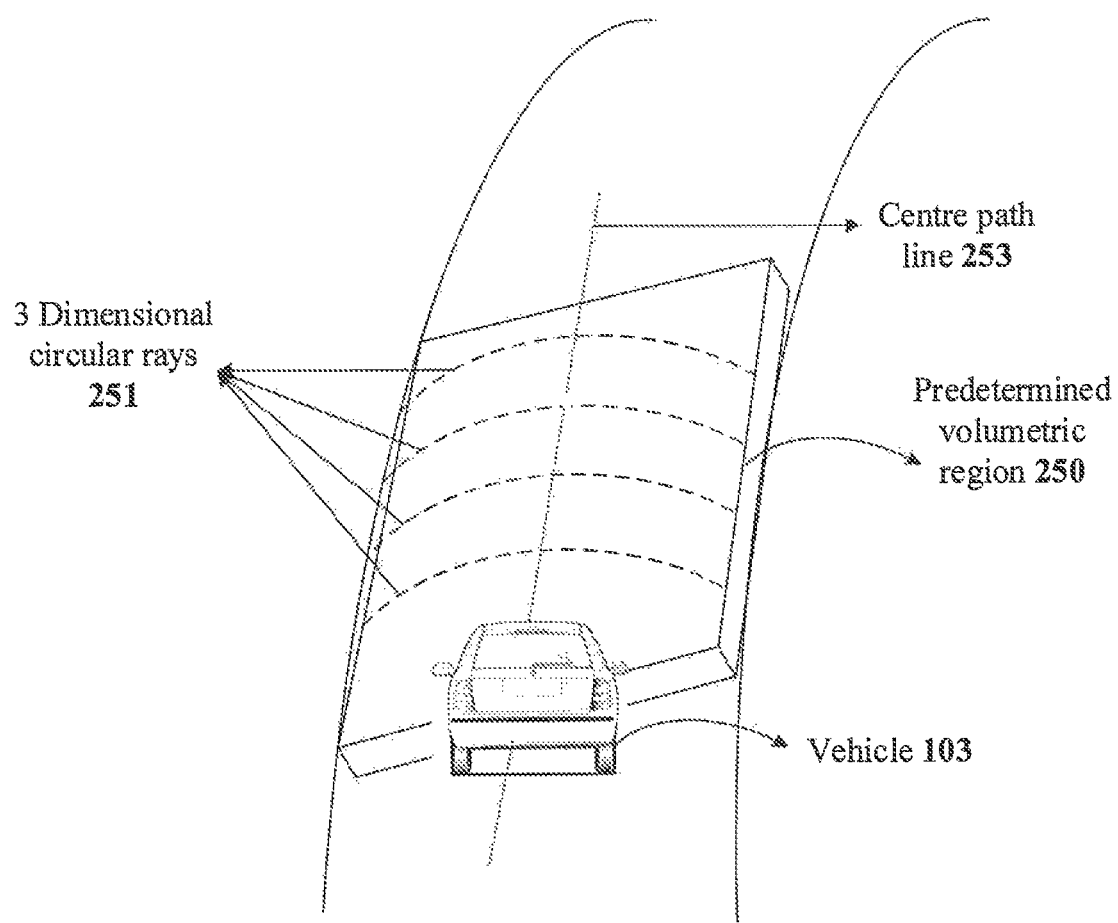
FIG. 2B-FIG. 2F show exemplary representations of various embodiments for generating a safe navigation path while a vehicle is navigating along a pre-generated navigation path, in accordance with some embodiments of the present disclosure.

Exemplary 3D circular rays 251 generated by the one or more sensors 105 within the exemplary predetermined volumetric region 250 is as shown in the FIG. 2B. In some embodiments, number of 3D circular rays may depend on type of the one or more sensors 105 configured in the vehicle 103. In some embodiments, surface height of the road may be equal to height of vehicle footprint on the road. As an example, the predefined surface height of the road may be +/−0.0 meter. Further, the point determining module 235 may detect a change in elevation from the predefined elevation at one or more points on the 3D circular rays, when the 3D circular rays incident on one or more obstacles on the road. As an example, the one or more obstacles may include, but not limited to, speed breakers, pot holes, stones and miscellaneous objects on the road affecting smooth driving experience of the vehicle 103.

The point determining module 235 may determine the one or more uneven points and the one or more boundary points based on, the change in the elevation of the 3D circular rays at the one or more points and status of the change in the elevation. In some embodiments, the status of the change in the elevation may include, but not limited to, permanent change in the elevation and temporary change in the elevation. In some embodiments, the point determining module 235 may determine the status of the change in elevation of the one or more points by observing change in elevation of points that are consecutive/neighbouring to the one or more points on the 3D circular rays. In some embodiments, when the change in the elevation of the points consecutive/neighbouring to the one or more points is determined to be equal or nearly equal to the change in the elevation of the one or more points, then the point determining module 235 may determine the status of the change in the elevation as "Permanent". On the contrary, when the change in the elevation of the points consecutive/neighbouring to the one or more points is determined to be different from the change in the elevation of the one or more points, then the point determining module 235 may determine the status of the change in the elevation as "Temporary". Therefore, when the status of the change in the elevation is 'Permanent" at the one or more points and the change in elevation is above a predefined elevation threshold or equal to the predefined elevation threshold, the point determining module 235 may determine the one or more points as the one or more boundary points of the road. In some embodiments, when the status of the change in the elevation is "Temporary" at the one or more points and the change in the elevation is below the predefined elevation threshold, the point determining module 235 may determine the one or more points as the one or more uneven points of the road. As an example, consider the predefined elevation threshold is 30 cm. Consider the change in the elevation is −10 cm. Since, the change in elevation is less than the predefined elevation threshold of 30 cm, and the status of the change in the elevation is temporary, the point determining module 235 may determine the point on the road that caused the change in the elevation of −10 cm as the uneven point on the road. Further, since the change in the elevation is a negative value, the point determining module 235 may determine type of the obstacle as a pot hole. Further, consider the change in the elevation is 40 cm. Since, the change in elevation is more than the predefined elevation threshold of 30 cm, and the status of the change in the elevation is permanent, the point determining module 235 may determine the point on the road that caused the change in the elevation of 40 cm as the boundary point on the road.

In some embodiments, the density determining module 237 may determine a preferred side from a centre path line of the road in the predetermined volumetric region based on density of the one or more uneven points. In some embodiments, the centre path line may be an imaginary line at middle of the road. An exemplary centre path line 253 may be as shown in the FIG. 2B. The density determining module 237 may initially determine the density of the one or more uneven points at one or more predefined perpendicular distances from the centre path line along orientation of the vehicle 103. As an example, consider d1, d2, d3 and d4 to be four predefined perpendicular distances as shown in the FIG. 2C. In some embodiments, the density determining module 237 may extract co-ordinates of the one or more uneven points on the road. Further, the density determining module 237 may determine the density of the one or more uneven points i.e. total number of the one or more uneven points within each of the one or more predefined perpendicular distances, that are bound within '−w' to '+w' distance from the centre path line as shown in the FIG. 2C. Initially, the density determining module 237 may compute the density of the one or more uneven points at each of the one or more predefined perpendicular distances within area which is horizontally bound between '−w' to '+w' by determining a total count of the one or more uneven points at each of the one or more predefined perpendicular distances. Further, the density determining module 237 may determine average density of the one or more uneven points using the below Equation 1.

$$\text{Average Density} = TN/TA \quad \text{Equation 1}$$

In the above Equation 1,
"TN" indicates total number of one or more uneven points; and
"TA" indicates total area covered.

In some embodiments, the density determining module 237 may determine area covered by the one or more uneven points at each of the one or more predefined perpendicular distances using the below Equation 2.

$$\text{Area covered between two} = 2w^*(d_{n+1}-d_n) \quad \text{Equation 2}$$

successive predefined perpendicular distances

Figure 2C:
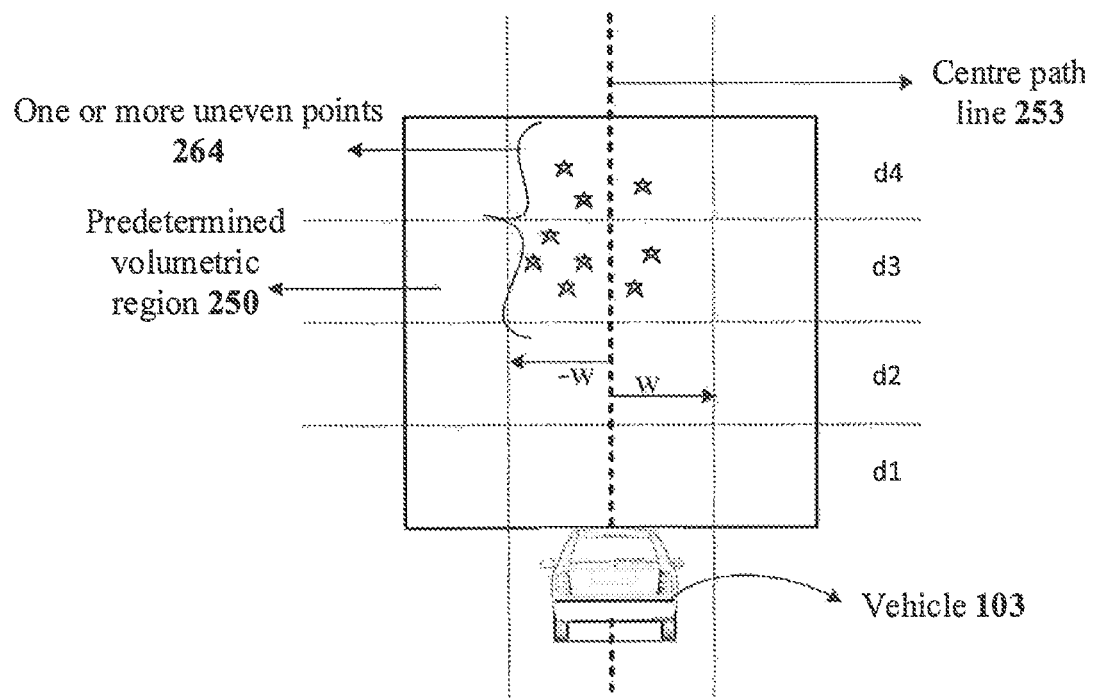

In the above Equation 2,
"w" indicates distance considered towards the left side and the right side of the centre path line as shown in the FIG. 2C; and
$d_{n+1}$ and $d_n$ indicate successive predefined perpendicular distances.

Using the above Equation 2, the density determining module 237 may determine area covered by the one or more uneven points at each of the one or more predefined perpendicular distances and total the individual areas covered to determine the total area covered by the one or more uneven points.

In some embodiments, the density of the one or more uneven points and the average density of the one or more uneven points may be stored as the density data 213. The density determining module 237 may determine if the centre path line should be shifted from initial position, based on the average density. If the average density of the one or more uneven points determined from initial position of the centre path line is more than a predefined density threshold, the density determining module 237 may determine that a shift is necessary. Further, to shift the centre path line, the density determining module 237 may determine a preferred side of the road, based on the average density of the one or more uneven points. In some embodiments, the density determining module 237 may initially perform a trial and error method to determine the average density of the one or more uneven points on left side and right side of the centre path line. The density determining module 237 may determine a side corresponding to the centre path line having the average density of the one or more uneven points less than or equal to the predefined density threshold, as the preferred side of the road.

In some embodiments, upon determining the preferred side of the road, the shifting module 239 may shift the centre path line for a distance identified from the centre path line towards the preferred side, to obtain a new centre path line. Initially, the shifting module 239 may shift initial position of the centre path line by a predefined distance on the preferred side of the road. As an example, the predefined distance may be 50 cm. Upon shifting the centre path line from the initial position, the shifting module 239 may trigger the point determining module 235 to determine one or more boundary points and the one or more uneven points on the road, concurrently, from a shifted position of the centre path line. Further, the shifting module 239 may trigger the density determining module 237 to determine density of the one or more uneven points at the one or more predefined perpendicular distances from the shifted position of the centre path line along the orientation of the vehicle 103. Upon determining density of the one or more uneven points at the one or more predefined perpendicular distances, the density-determining module 237 may compute an average density of the one or more uneven points corresponding to the shifted position of the centre path line. In some embodiments, the shifting module 239 may check for a condition, if the average density of the one or more uneven points corresponding to the shifted position of the centre path line in current iteration is less than the average density of the one or more uneven points determined in previous iteration i.e. the average density of the one or more uneven points determined from the initial position of the centre path line. If the condition is true, then the shifting module 239 may proceed further on the preferred side. If the condition is false, the shifting module 239 may proceed on other side of the initial position of the centre path line.

Further, the shifting module 239 may reiterate the steps of shifting position of the centre path line by the predefined distance, determining the one or more boundary points and the one or more uneven points from each shifted position of the centre path line, and computing the average density of the one or more uneven points at each shifted position of the centre path line, until, two primary conditions mentioned below are satisfied. In some embodiments, primary condition 1 may be that, the average density of the one or more uneven points corresponding to the shifted position of the centre path line in the current iteration, is determined to be least when compared to the average density computed in each of the previous iterations. In some embodiments, primary condition 2 may be that, the shifted position of the centre path line in the current iteration is at a predefined safe distance from the one or more boundary points. In some embodiments, the least average density of the one or more uneven points on the road may be zero. Upon reaching the point that satisfies both the primary conditions, the shifting module 239 may determine the distance between initial position of the centre path line and the shifted position of the centre path line in the current iteration, on the preferred side of the road. Upon determining the distance, the shifting module 239 may shift the centre path line for the distance determined from the centre path line towards the preferred side, to obtain the new centre path line. In some embodiments, the distance determined by the shifting module 239 to obtain the new centre path line for each predetermined volumetric region selected by the path generating system 107, until the vehicle 103 reaches the destination point, may be stored as the distance data 215.

Figure 2D:
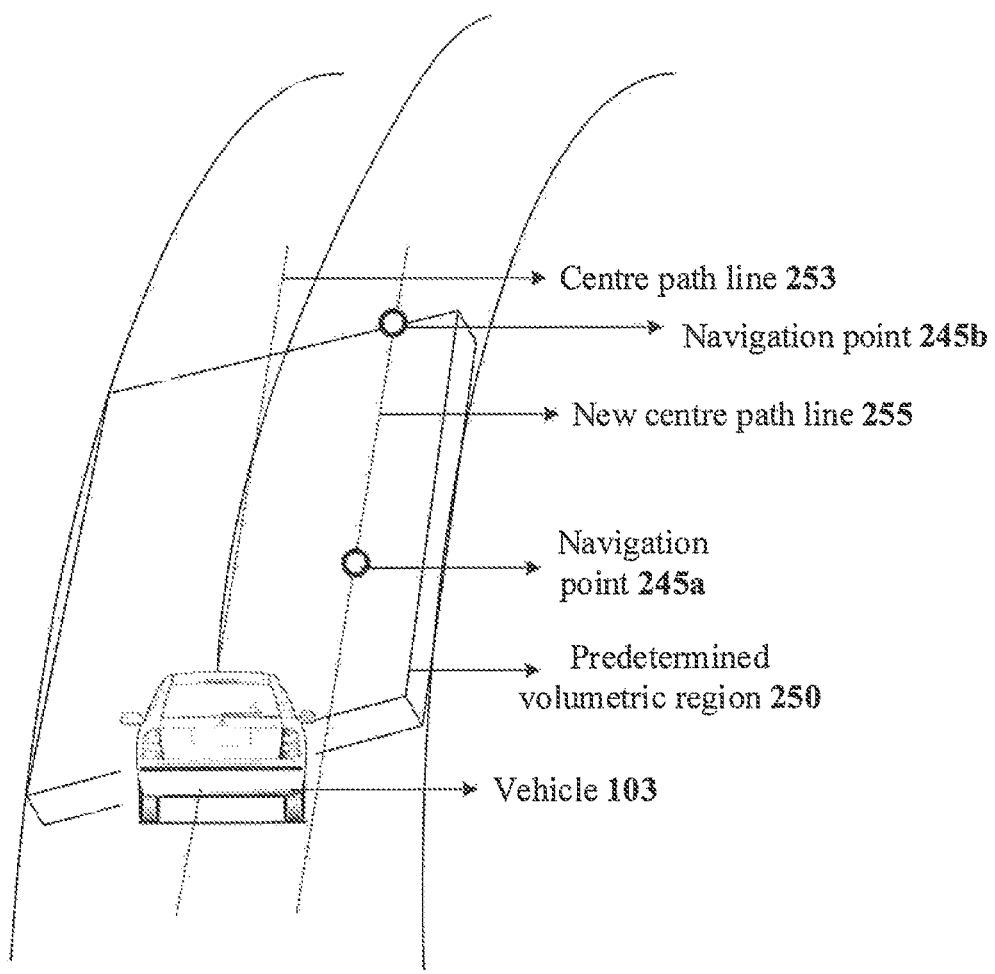

In some embodiments, the path generating module 243 may generate a safe navigation path for safe navigation of the vehicle 103. The safe navigation path may be stored as the navigation data 217. In some embodiments, the path generating module 243 may indicate plurality of navigation points on the new centre path line. In a preferred embodiment, the path generating module 243 may indicate two navigation points on the new centre path line. In some embodiments, one navigation point may be indicated at end of the predetermined volumetric region and another navigation point may be indicated at middle of the predetermined volumetric region, on the new centre path line. Exemplary navigation points 245a and 245b indicated by the path generating module 243 on an exemplary new centre path line 255 is as shown in the FIG. 2D. Further, the path generating module 243 may curve fit the plurality of navigation points on the new centre path line using one or more predefined curve fitting techniques, to generate the safe navigation path for safe navigation of the vehicle 103.

Upon generating the safe navigation path, the path generating module 243 may provide the safe navigation path to a navigation module 114 associated with the path generating system 107 for navigating the vehicle 103. In some embodiments, the navigation module 114 may be configured in the vehicle 103. The navigation module 114 may determine a command velocity for the vehicle 103 based on dynamic data received for navigating the vehicle 103 along the safe navigation path. As an example, the dynamic data may be data related to, terrain associated with the safe navigation path, other vehicles moving in opposite direction to the vehicle 103 and the like. When the vehicle 103 is navigating along the safe navigation path, the vehicle 103 may experience minimum jerks or no jerks, thereby resulting in a smooth driving experience for the vehicle 103. In some scenarios where the path generating system 107 determines no point on the road that has the average density lower than the predefined density threshold, the vehicle 103 may be left to navigate along the pre-generated path originally present with the navigation module 114.

Henceforth, the process of generating a safe navigation path in real-time for safe navigation of the vehicle 103 is explained with the help of one or more examples for better understanding of the present disclosure. However, the one or more examples should not be considered as limitation of the present disclosure.

Figure 2E:
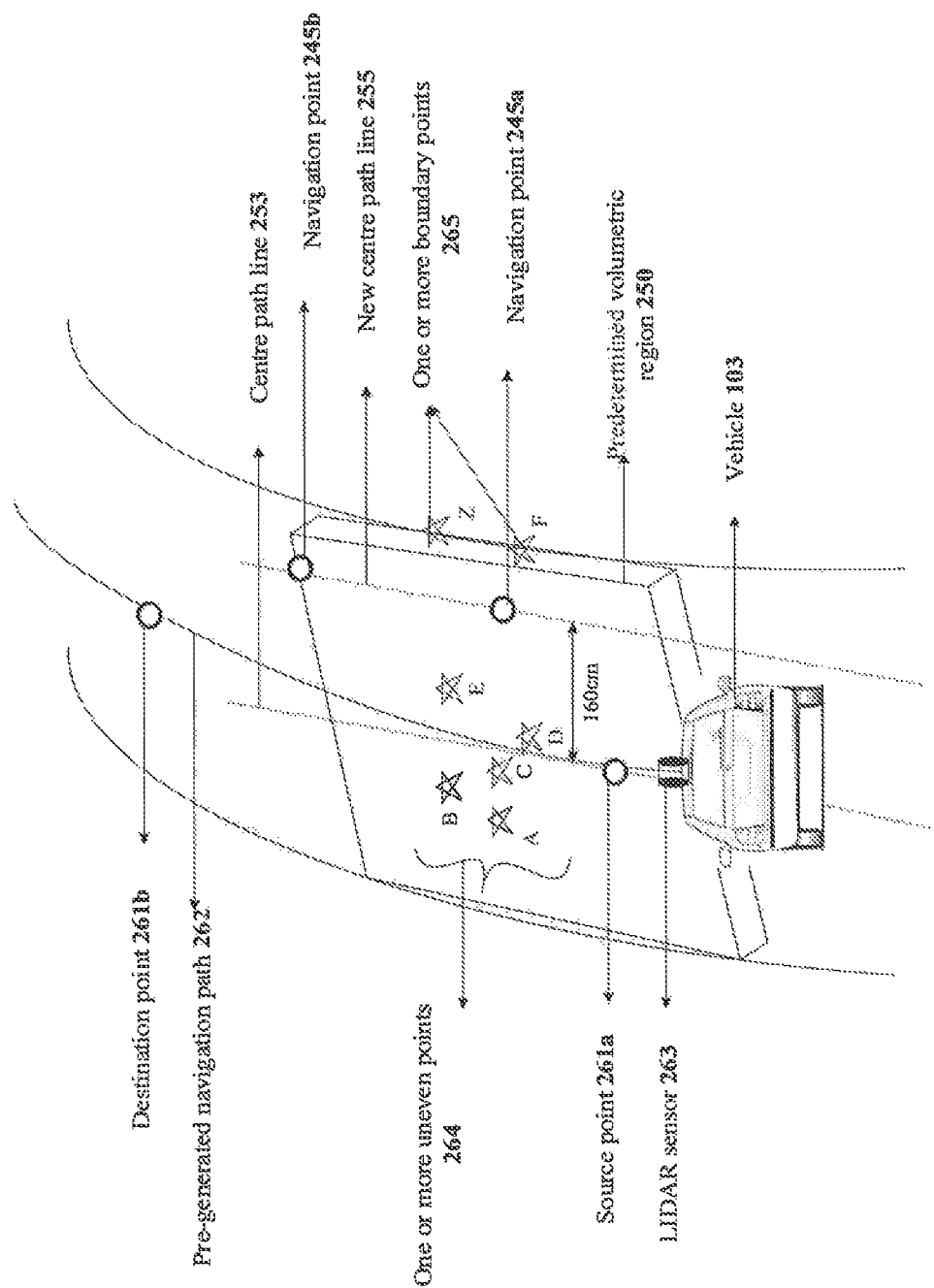

Consider an exemplary scenario as shown in the FIG. 2E, where the vehicle 103 intends to travel from the source point 261a to the destination point 261b through the pre-generated navigation path 262. Consider, that the LIDAR sensor 263 is fixed at a top position of the vehicle 103 as shown in the FIG. 2E. Further, the LIDAR sensor 263 may generate the exemplary 3D circular rays 251 in the exemplary predetermined volumetric region 250, at a predefined elevation of 3 cm from the predefined surface height of the road. Further, consider the predefined elevation threshold is 30 cm. Consider the change in elevation at the one or more points on the 3D circular rays 251 as shown in the below

TABLE 1

| Point | Change in elevation | Status |
| --- | --- | --- |
| Point A | 10 | Temporary |
| Point B | 15 | Temporary |
| Point C | 15 | Temporary |
| Point D | 20 | Temporary |
| Point E | 30 | Temporary |
| Point F | 43 | Permanent |
| — | — | — |
| Point Z | 45 | Permanent |

In the above Table 1, the one or more points having the temporary change in elevation less than the predefined elevation threshold 30 cm, such as, Point A, Point B, Point C and the like, may be the one or more uneven points 264, and the one or more points such as Point F and Point Z, having the permanent change in elevation more than the predefined elevation threshold 30 cm, may be the one or more boundary points 265 as shown in the FIG. 2E.

Further, the path generating system 107 may determine the preferred side by determining average density of the one or more uneven points 264 from the current position of the vehicle 103 on the exemplary centre path 253. Consider that, the average density of the one or more uneven points 264 is less on right side of the centre path line 253 compared to left side of the centre path line 253. Therefore, the right side of the centre path line 253 may be determined as the preferred side of the road.

Upon determining the preferred side of the road, the path generating system 107 may determine the distance by which initial position of the centre path line 253 should be shifted on the preferred side of the road. The path generating system 107 may determine the distance by following the steps mentioned above under the shifting module 239. Exemplary average densities of the one or more uneven points 264 at each position of the centre path line upon shifting by the predefined distance of 40 cm is as shown in the below Table 2.

TABLE 2

| Position | Average density of the one or more uneven points 264 | Total distance from initial position of the centre path line 253 |
| --- | --- | --- |
| Position 1 | X | 40 cm |
| Position 2 | X - 10 | 80 cm |
| Position 3 | X - 25 | 120 cm |
| Position 4 | 0 | 160 cm |

According to the above Table 2, the average density of the one or more uneven points 264 is least i.e. 0 at the distance of 160 cm from the initial position of the centre path line 253. Therefore, the path generating system 107 may shift the centre path line 253 by the distance 160 cm towards the preferred side of the road, i.e. right side of the road, to obtain the new centre path line 255 as shown in the FIG. 2E.

Figure 2F:
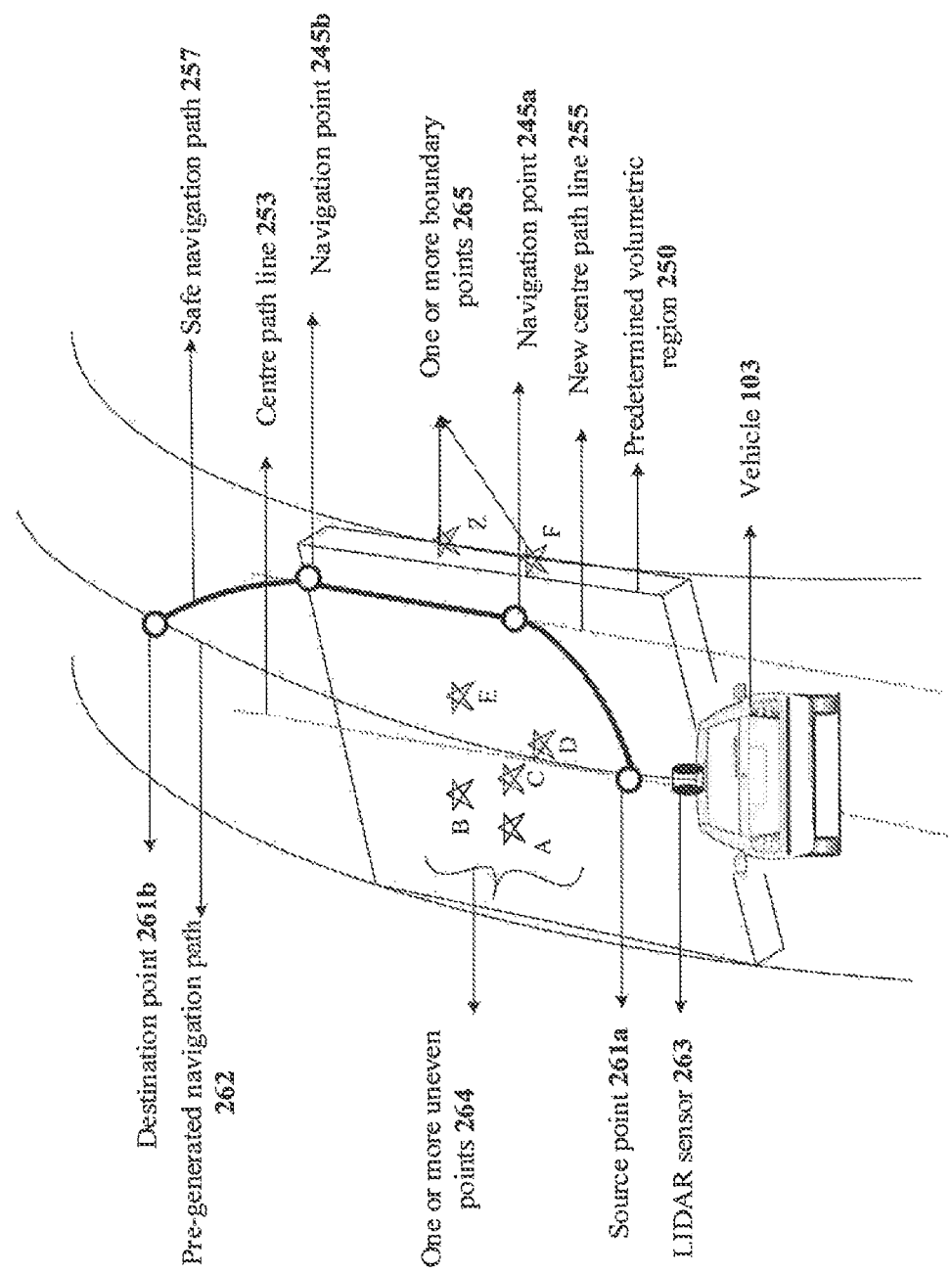

Further, the path generating system 107 may indicate two exemplary navigation points 245a and 245b on the new centre path line 255 as shown in the FIG. 2F, to obtain the safe navigation path 257 as shown in the FIG. 2F.

Figure 3:
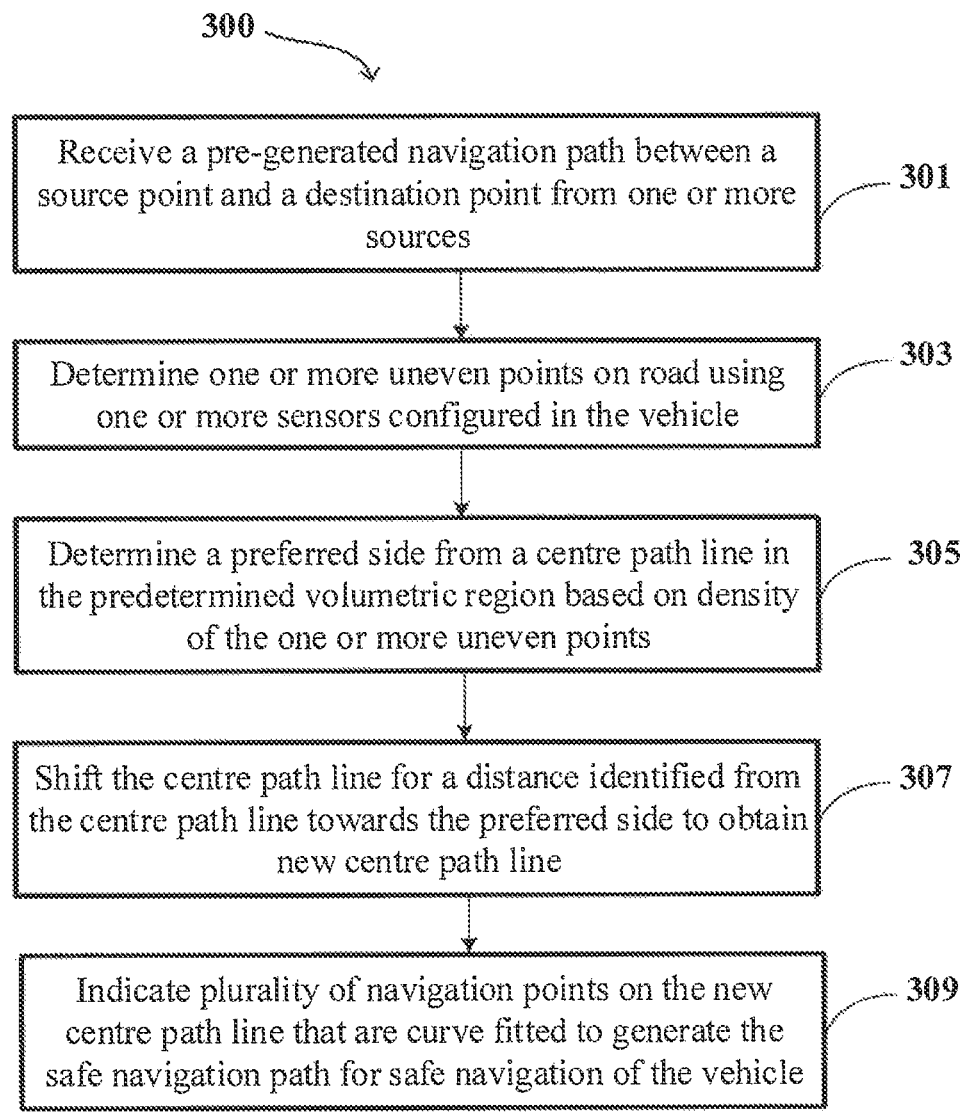
FIG. 3 shows a flowchart illustrating a method of generating a safe navigation path in real-time for safe navigation of a vehicle in accordance with some embodiments of the present disclosure.

FIG. 3 shows a flowchart illustrating a method of generating a safe navigation path in real-time for safe navigation of a vehicle in accordance with some embodiments of the present disclosure.

As illustrated in FIG. 3, the method 300 includes one or more blocks illustrating a method of generating a safe navigation path in real-time for safe navigation of a vehicle 103. The method 300 may be described in the general context of computer executable instructions.

Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the path generating system 107, a pre-generated navigation path between a source point and a destination point from one or more sources 101. As an example, the one or more sources 101 may include, but not limited to, an application related to maps such as a navigation application and a database storing static maps. The one or more sources 101 may obtain the pre-generated navigation path using one or more predefined standard techniques such as Dijkstra's algorithm, A-star algorithm and the like, upon receiving the source point and the destination point.

At block 303, the method 300 may include determining, by the processor 109 one or more uneven points on the road, within a predetermined volumetric region from a current position of the vehicle 103, while the vehicle 103 is navigating in the pre-generated navigation path. In some embodiments, the one or more uneven points may be determined using one or more sensors 105 configured in the vehicle 103. As an example, the one or more sensors 105 may include, but not limited to, Light Detection and Ranging (LIDAR) sensors. In some embodiments, the processor 109 may concurrently determine one or more boundary points of the road using the one or more sensors 105.

At block 305, the method 300 may include, determining, by the processor 109, a preferred side from a centre path line of the road in the predetermined volumetric region based on density of the one or more uneven points. In some embodiments, the centre path line may be an imaginary line at middle of the road.

At block 307, the method 300 may include, shifting, by the processor 109, the centre path line for a distance identified from the centre path line towards the preferred side, to obtain a new centre path line. In some embodiments, the processor 109 may shift initial position of the centre path line by a predefined distance on the preferred side of the road and may determine one or more boundary points and the one or more uneven points on the road, concurrently, from a shifted position of the centre path line. Further, the processor 109 may determine density of the one or more uneven points at one or more predefined perpendicular distances from the shifted position of the centre path line along orientation of the vehicle 103, to further compute an average density of the one or more uneven points corresponding to the shifted position of the centre path line. In some embodiments, if the average density of the one or more uneven points corresponding to the shifted position of the centre path line in current iteration, is less than the average density of the one or more uneven points determined in previous iteration the processor 109 may proceed further on the preferred side. Further, the processor 109 may reiterate the steps of shifting position of the centre path line by the predefined distance, determining the one or more boundary points and the one or more uneven points from each shifted position of the centre path line, and computing the average density of the one or more uneven points at each shifted position of the centre path line. In some embodiments, the processor 109 may reiterate the steps, until, the average density of the one or more uneven points corresponding to the shifted position of the centre path line in the current iteration, is determined to be least when compared to the average density computed in each of the previous iterations, and the shifted position of the centre path line in the current iteration is at a predefined safe distance from the one or more boundary points. Upon reaching the point that satisfies both the above mentioned conditions, the processor 109 may determine the distance between initial position of the centre path line and the shifted position of the centre path line in the current iteration, on the preferred side of the road. By shifting the centre path line by the determined distance, the processor 109 may obtain the new centre path line.

At block 309, the method includes, indicating, by the processor 109, plurality of navigation points on the new centre path line. In some embodiments, the processor 109 may curve fit the plurality of navigation points using one or more predefined curve fitting techniques to generate the safe navigation path for safe navigation of the vehicle 103.

Figure 4:
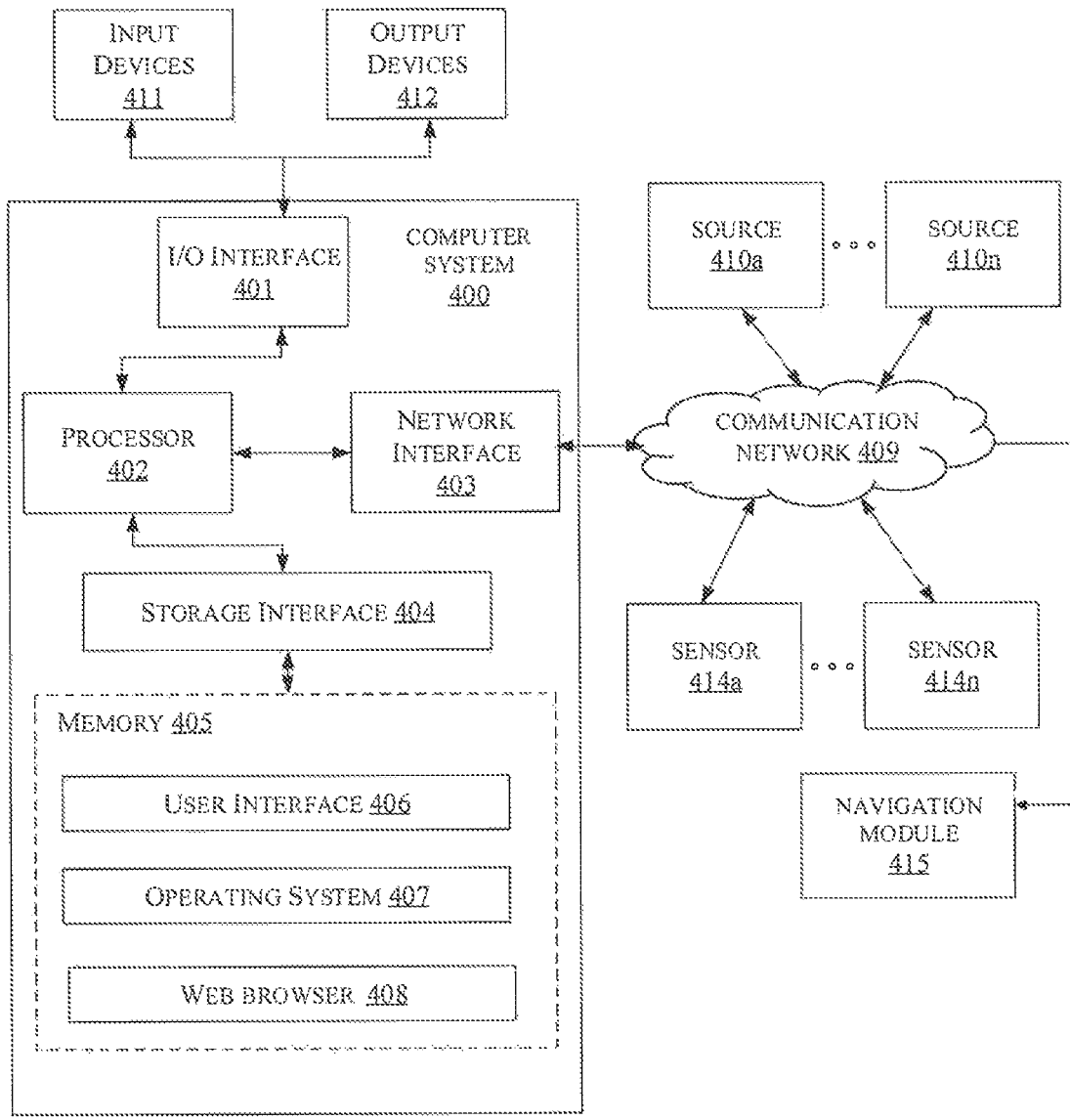
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be path generating system 107 that is used for generating a safe navigation path in real-time for safe navigation of a vehicle 103. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more sources 410 (410$_a$ up to 410$_n$), one or more sensors 414 (414$_a$ up to 414$_n$), and a navigation module 415. The communication network 409 can be implemented as one of the different types of networks, such as intranet or Local Area Network (LAN), Closed Area Network (CAN) and such within the vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sources 410 may include, but not limited to, a navigation application, an application related to maps and a database comprising static maps. The one or more sensors 414 may include, but not limited to, Light Detection and Ranging (LIDAR) sensors. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X°, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS' (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

The present disclosure provides a method and a system for generating a safe navigation path in real-time for safe navigation of a vehicle.

In the present disclosure, the safe navigation path may help the vehicle to navigate away from the one or more uneven points on the road, thereby ensuring smooth navigation without any jerks or with minimal jerks.

In the present disclosure, the safe navigation path generated in the present disclosure ensures no damage for the vehicle occurring due to the one or more obstacles on the road, thereby resulting in good performance of the vehicle.

The present disclosure increases safety of passengers in the vehicle navigating along the safe navigation path.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a safe navigation path in real-time for safe navigation of a vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 101 | One or more sources |
| 103 | Vehicle |
| 105 | One or more sensors |
| 107 | Path generating system |
| 109 | Processor |
| 111 | I/O interface |
| 113 | Memory |
| 114 | Navigation module |
| 203 | Data |
| 205 | Modules |
| 207 | Path data |

-continued

Referral numerals

| Reference Number | Description |
|---|---|
| 209 | Region data |
| 211 | Surface condition data |
| 213 | Density data |
| 215 | Distance data |
| 217 | Safe navigation data |
| 219 | Other data |
| 231 | Receiving module |
| 233 | Region determining module |
| 235 | Point determining module |
| 237 | Density determining module |
| 239 | Shifting module |
| 243 | Path generating module |
| 244 | Other modules |
| 245a and 245b | Exemplary navigation points |
| 250 | Exemplary predetermined volumetric region |
| 251 | Exemplary 3 Dimensional circular rays |
| 253 | Exemplary centre path line |
| 255 | Exemplary new centre path line |
| 257 | Exemplary safe navigation path |
| 261a | Source point |
| 261b | Destination point |
| 262 | Exemplary pre-generated navigation path |
| 263 | LIDAR sensor |
| 264 | Exemplary one or more uneven points |
| 265 | Exemplary one or more boundary points |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 410 | One or more sources of the exemplary computing system |
| 411 | Input devices |
| 412 | Output devices |
| 414 | One or more sensors of the exemplary computing system |
| 415 | Navigation module of the exemplary computing system |

What is claimed:

1. A method for generating a safe navigation path in real-time for safe navigation of a vehicle, the method comprising:

receiving, by a path generating system associated with the vehicle, a pre-generated navigation path between a source point and a destination point, from one or more sources;

determining, while the vehicle is navigating in the pre-generated navigation path, by the path generating system, one or more uneven points on road, within a predetermined volumetric region from a current position of the vehicle, using one or more sensors configured in the vehicle;

determining, by the path generating system, a preferred side from a centre path line of the road in the predetermined volumetric region based on density of the one or more uneven points, wherein determining the preferred side of the road comprises:

determining, by the path generating system, the density of the one or more uneven points at one or more predefined perpendicular distances from the centre path line along orientation of the vehicle, wherein the density of the one or more uneven points corresponds to total number of the one or more uneven points within each of the one or more predefined perpendicular distances; and determining, by the path generating system, a side corresponding to the centre path line having an average density of the one or more uneven points less than or equal to a predefined density threshold, as the preferred side of the road;

shifting, by the path generating system, the centre path line for a distance identified from the centre path line towards the preferred side, to obtain a new centre path line; and indicating, by the path generating system, plurality of navigation points on the new centre path line, wherein the plurality of navigation points is curve fitted to generate the safe navigation path for safe navigation of the vehicle.

2. The method as claimed in claim 1, wherein determining the one or more uneven points comprises:

generating, by the path generating system, 3-Dimensional (3D) circular rays at a predefined elevation from a predefined surface height of the road using the one or more sensors, in the predetermined volumetric region;

detecting, by the path generating system, a change in elevation from the predefined elevation at one or more points on the 3D circular rays, when the 3D circular rays incident on one or more obstacles on the road; and determining, by the path generating system, the one or more points as at least one of, one or more boundary points, or the one or more uneven points based on the change in the elevation and status of the change in the elevation, wherein the status of the change in the elevation is at least one of permanent or temporary.

3. The method as claimed in claim 2, wherein the one or more obstacles are at least one of speed breakers, pot holes, stones and miscellaneous objects on the road affecting smooth driving experience of the vehicle.

4. The method as claimed in claim 1, wherein determining the preferred side of the road further comprises:

computing, by the path generating system, the average density of the one or more uneven points based on the density of the one or more uneven points determined at each of the one or more predefined perpendicular distances.

5. The method as claimed in claim 1, wherein identifying the distance on the preferred side of the road comprises:

shifting, by the path generating system, initial position of the centre path line by a predefined distance on the preferred side of the road;

determining, by the path generating system, one or more boundary points and the one or more uneven points on the road, concurrently, from a shifted position of the centre path line;

determining, by the path generating system, density of the one or more uneven points at one or more predefined perpendicular distances from the shifted position of the centre path line;

computing, by the path generating system, average density of the one or more uneven points corresponding to the shifted position of the centre path line;

re-iterating, by the path generating system, the steps of shifting positions of the centre path line by the predefined distance, determining the one or more boundary points and the one or more uneven points from each shifted position of the centre path line, and computing the average density at each shifted position of the centre path line, until, the average density of the one or more uneven points corresponding to the shifted position of the centre path line in current iteration is determined to be least when compared to the average density computed in each previous iteration, and the shifted position of the centre path line in the current iteration is at a predefined safe distance from the one or more boundary points; and computing, by the path generating system, the distance on the preferred side of the road based on the initial position of the centre path line and the shifted position of the centre path line in the current iteration.

6. The method as claimed in claim 1 further comprises providing, by the path generating system, the safe navigation path to a navigation module associated with the path generating system for navigating the vehicle.

7. The method as claimed in claim 1, wherein the one or more sensors comprises a Light Detection and Ranging (LIDAR) sensor.

8. The method as claimed in claim 1, wherein the vehicle is at least one of an autonomous vehicle and a non-autonomous vehicle.

9. A path generating system for generating a safe navigation path in real-time for safe navigation of a vehicle, the path generating system comprises:
   a processor; and
   a memory communicatively coupled to the processor, wherein the memory stores processor-executable instructions, which, on execution, causes the processor to:
   receive a pre-generated navigation path between a source point and a destination point, from one or more sources;
   determine, while the vehicle is navigating in the pre-generated navigation path, one or more uneven points on the road, within a predetermined volumetric region from a current position of the vehicle, using one or more sensors configured in the vehicle;
   determine a preferred side from a centre path line of the road in the predetermined volumetric region based on density of the one or more uneven points, wherein to determine the preferred side of the road, the instructions cause the processor to:
      determine the density of the one or more uneven points at one or more predefined perpendicular distances from the centre path line along the orientation of the vehicle,
      wherein the density of the one or more uneven points corresponds to total number of the one or more uneven points within each of the one or more predefined perpendicular distances; and
      determine a side corresponding to the centre path line having an average density of the one or more uneven points less than or equal to a predefined density threshold, as the preferred side of the road;
   shift the centre path line for a distance identified from the centre path line towards the preferred side, to obtain a new centre path line; and
   indicate plurality of navigation points on the new centre path line, wherein the plurality of navigation points is curve fitted to generate the safe navigation path for safe navigation of the vehicle.

10. The path generating system as claimed in claim 9, wherein to determine the one or more uneven points, the instructions cause the processor to:
   generate 3-Dimensional (3D) circular rays at a predefined elevation from a predefined surface height of the road using the one or more sensors, in the predetermined volumetric region;
   detect a change in elevation from the predefined elevation at one or more points on the 3D circular rays, when the 3D circular rays incident on one or more obstacles on the road; and
   determine the one or more points as at least one of, one or more boundary points, or the one or more uneven points based on the change in the elevation and status of the change in the elevation, wherein the status of the change in the elevation is at least one of permanent or temporary.

11. The path generating system as claimed in claim 10, wherein the one or more obstacles are at least one of speed breakers, pot holes, stones and miscellaneous objects on the road affecting smooth driving experience of the vehicle.

12. The path generating system as claimed in claim 9, wherein to determine the preferred side of the road, the instructions further cause the processor to:
   compute the average density of the one or more uneven points based on the density of the one or more uneven points determined at each of the one or more predefined perpendicular distances.

13. The path generating system as claimed in claim 9, wherein to identify the distance on the preferred side of the road, the instructions cause the processor to:
   shift initial position of the centre path line by a predefined distance on the preferred side of the road;
   determine one or more boundary points and the one or more uneven points on the road, concurrently, from a shifted position of the centre path line;
   determine density of the one or more uneven points at one or more predefined perpendicular distances from the shifted position of the centre path line;
   compute average density of the one or more uneven points corresponding to the shifted position of the centre path line;
   re-iterate the steps of shifting positions of the centre path line by the predefined distance, determining the one or more boundary points and the one or more uneven points from each shifted position of the centre path line, and computing the average density at each shifted position of the centre path line, until,
   the average density of the one or more uneven points corresponding to the shifted position of the centre path line in current iteration is determined to be least when compared to the average density computed in each previous iterations, and
   the shifted position of the centre path line in the current iteration is at a predefined safe distance from the one or more boundary points; and
   compute the distance on the preferred side of the road based on the initial position of the centre path line and the shifted position of the centre path line in the current iteration.

14. The path generating system as claimed in claim 9, wherein the processor is further configured to provide the safe navigation path to a navigation module associated with the path generating system for navigating the vehicle.

15. The path generating system as claimed in claim 9, wherein the one or more sensors comprises a Light Detection and Ranging (LIDAR) sensor.

16. The path generating system (107) as claimed in claim 9, wherein the vehicle is at least one of an autonomous vehicle and a non-autonomous vehicle.

17. A non-transitory computer readable medium including instructions stored thereon that when processed by at least one processor causes a path generating system to perform operations comprising:

receiving a pre-generated navigation path between a source point and a destination point, from one or more sources;

determining, while the vehicle is navigating in the pre-generated navigation path, one or more uneven points on road, within a predetermined volumetric region from a current position of the vehicle, using one or more sensors configured in the vehicle;

determining a preferred side from a centre path line of the road in the predetermined volumetric region based on density of the one or more uneven points;

shifting the centre path line for a distance identified from the centre path line towards the preferred side, to obtain a new centre path line; and indicating plurality of navigation points on the new centre path line, wherein the plurality of navigation points is curve fitted to generate the safe navigation path for safe navigation of the vehicle.

* * * * *